N. H. BROKAW.
BLOCK PRESSER FOR WOOD PAPER PULP MACHINES.
No. 10,429. Reissued Dec. 25, 1883.
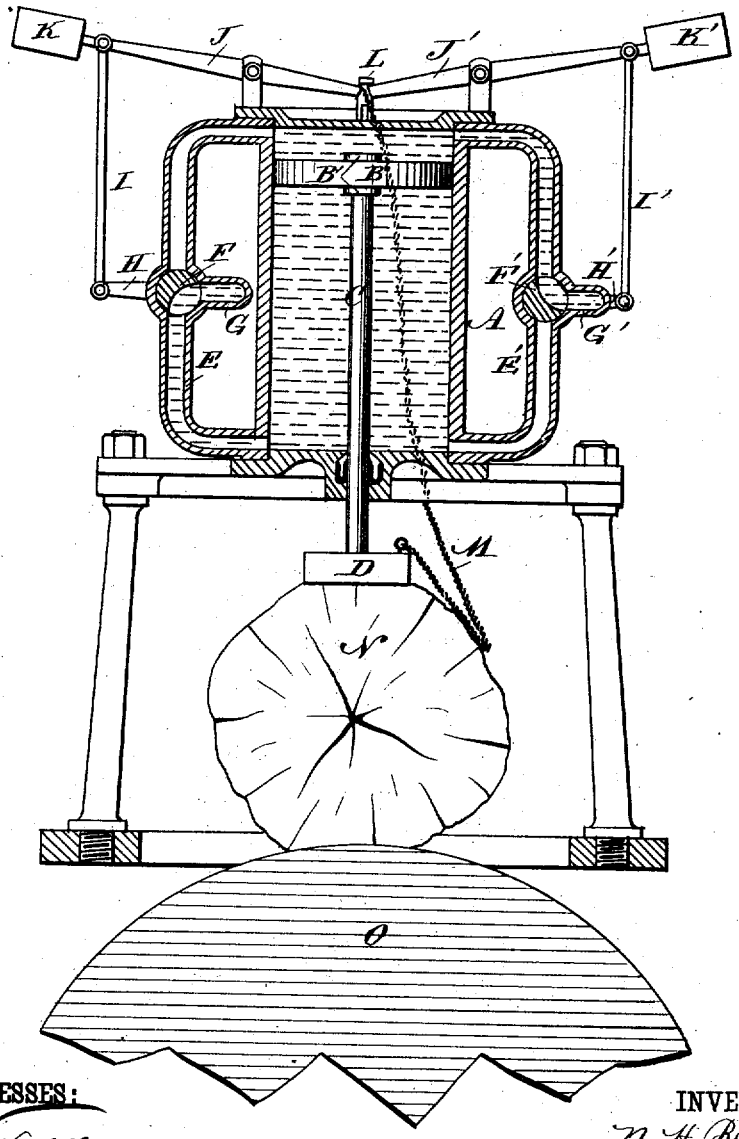
WITNESSES:
C. Neveux
C. Sedgwick
INVENTOR:
N. H. Brokaw
BY Munn & Co.
ATTORNEYS.
N. PETERS, Photo-Lithographer, Washington, D. C.

UNITED STATES PATENT OFFICE.

NORMAN H. BROKAW, OF MARINETTE, WISCONSIN.

BLOCK-PRESSER FOR WOOD-PAPER-PULP MACHINES.

SPECIFICATION forming part of Reissued Letters Patent No. 10,429, dated December 25, 1883.

Original No. 271,409, dated January 30, 1883. Application for reissue filed December 1, 1883.

*To all whom it may concern:*

Be it known that I, NORMAN H. BROKAW, of Marinette, in the county of Marinette and State of Wisconsin, have invented a new and Improved Block-Presser for Wood-Paper-Pulp Machines, of which the following is a full, clear, and exact description.

The object of my invention is to provide a new and improved device for pressing the blocks of wood upon the grinding or abrading surface of a paper-pulp machine.

The invention consists in a head-block attached to the lower end of a piston-rod attached to a piston in a cylinder having its ends connected at opposite sides by tubes containing three-way cocks provided with arms connected by suitable arms with levers pivoted on the top of the cylinder, and having their outer ends weighted, and having their inner ends adapted to be held by a latch connected by a suitable device with the head-block, whereby, when compressed air, steam, or a liquid is admitted in the cylinder, the head-block will be moved downward and will press the block of wood on the grinding-surface, and when this head-block has descended sufficiently the latch is opened, the inner ends of the levers are released, the cocks are reversed, and the piston and head-block will be raised.

Reference is to be had to the accompanying drawings, forming part of this specification, in which a longitudinal sectional elevation of my improved block-presser is shown.

The cylinder A, closed at the top and bottom, contains a piston, B, to which a rod, C, is attached, projecting from the lower end of the piston, to the lower end of which piston-rod an ordinary head-block, D, is attached. The ends of the cylinder A are connected at opposite sides by tubes E E′, each provided in the middle with a three-way cock, F or F′, at which cocks outlet and supply pipes G G′ are connected with the tubes E E′, respectively. To the cocks F F′ arms H H′ are attached, and the outer ends of these arms are connected by rods I I′ with the outer ends of levers J J′, pivoted on the top of the cylinder, which levers have weights K K′ mounted on the outer ends. The inner ends of the levers J J′ are adapted to meet and to pass under a latch, L, on the top of the cylinder, which latch is connected by a chain or cord, M, with the head-block D. The block of wood N is held between the grinder O and the head-block D.

The operation is as follows: If the piston B is raised, as shown, the cock F′ will be open and the cock F will be closed—that is, the water can only enter the cylinder at the upper end of the tube E′ and only leave the cylinder at the lower end of the tube E. The outer ends of the levers J J′ will be raised and the inner ends will be lowered and held under the latch L. The water forces the piston B downward and presses the block of wood N upon the grinding-surface. When the head-block has descended as much as desired—that is, when the entire block has been ground to fiber—the chain M, which is so adjusted that it will then be drawn taut, acts on the latch L and releases the inner ends of the levers J J′. The weights K K′ on these levers draw the outer ends of these levers downward and operate the cocks, whereby the cock F will be opened and the cock F′ will be closed, so that the water can only enter at the lower end of the tube E′ and must pass off at the upper end of the tube E—that is, the piston will be raised. Then the inner ends of the levers J J′ are lowered and locked by means of the latch L, so that the water can enter, as described above, and the piston will be lowered again.

In place of water, oil, alcohol, or any other liquid, or gases, vapors, compressed air, or steam, may be used to operate the block-presser.

The mechanism is very simple, is reversed automatically, and always exerts a uniform pressure on the block.

A projection, B′, is provided both on the upper and lower surfaces of the piston, and these projections prevent the piston from being raised or lowered sufficiently to close the ends of the tubes E E′.

Having thus described my invention, what I claim as new, and desire to secure by Letters Patent, is—

1. A block-presser for paper-pulp mills, consisting of a hydraulic press having the upper and lower ends of its cylinder connected with a pipe or pipes which are provided with cocks for admitting the liquid into the upper or lower ends of the cylinder, substantially as herein shown and described, and for the purpose set forth.

2. A block-presser for pulp-mills, consisting of a hydraulic press the cylinder of which has its upper and lower ends connected with a pipe or pipes which are provided with cocks for admitting the liquid into either end of the cylinders, which cocks are provided with devices for automatically adjusting them when the piston arrives at the end of its downward stroke, substantially as herein shown and described, and for the purpose set forth.

3. A block-presser for pulp-mills, consisting of a hydraulic press provided with means for conducting the liquid into the upper end of the cylinder to press the piston downward, and with means for admitting the liquid into the lower end of the cylinder for the purpose of forcing the piston upward after it has completed its downward stroke, substantially as herein shown and described, and for the purpose set forth.

4. In a block-presser for pulp-mills, the combination, with the cylinder A, of the tubes E E′, connecting the ends of the cylinder, the three-way cocks F F′, the piston B, and the rod C, substantially as herein shown and described, and for the purpose set forth.

5. In a block-presser for pulp-mills, the combination, with the cylinder A, of the tubes E E′, the three-way cocks F F′, the arms H H′, the rods I I′, the levers J J′, the weights K K′, the latch L, the piston B, the rod C, the head-block D, and a device for connecting the piston-rod or head-block with the latch L, substantially as herein shown and described, and for the purpose set forth.

NORMAN H. BROKAW.

Witnesses:
WM. S. BAKER,
W. L. EDMONDS.